United States Patent Office 3,452,724
Patented July 1, 1969

3,452,724
ROTATING INTERNAL COMBUSTION ENGINE
Rumfil T. Marszal, 162 Lambert Ave.,
Meriden, Conn. 06450
Filed Feb. 27, 1967, Ser. No. 624,642
Int. Cl. F04c 29/02, 29/04
U.S. Cl. 123—16                                    2 Claims

ABSTRACT OF THE DISCLOSURE

A rotary combustion engine with positive compression sealing that automatically compensates for wear; that has a simple system for cooling and lubricating the rotor and directs expanding forces to best advantage. An engine of few moving parts that can be made in all sizes easily and inexpensively.

---

My invention relates to the rotary internal combustion engine and more particularly to the radial vane type rotary internal combustion engine having a stator with a circular inner chamber and a centrally shafted circular rotor of a smaller diameter mounted eccentrically therein which performs intake, compression, expansion and exhaust in each cycle.

Rotary engines are recognized as having advantages over reciprocating piston type engines in that power is applied directly to the output shaft. Turbine engines share this advantage but suffer from continuous high heat and poor efficiency when idling at low r.p.m. Other type rotary engines suffer from poor sealing, poor heat dissipation and poor utilization of expansion force. It is the purpose of this invention to disclose a rotary internal combustion engine which offers improvements in construction and operation over engines which have been devised heretofore.

An object of this invention is to provide positive sealing for proper fuel-air intake, compression, expansion and exhaust.

Another object is to provide good heat transfer and lubrication of the rotor and sliding members therein.

And still another object is to utilize the force of expansion smoothly and efficiently.

In the following part of this disclosure the details of construction and operation of a presently preferred embodiment of this invention are described with reference to the accompanying drawings.

Figure 1:
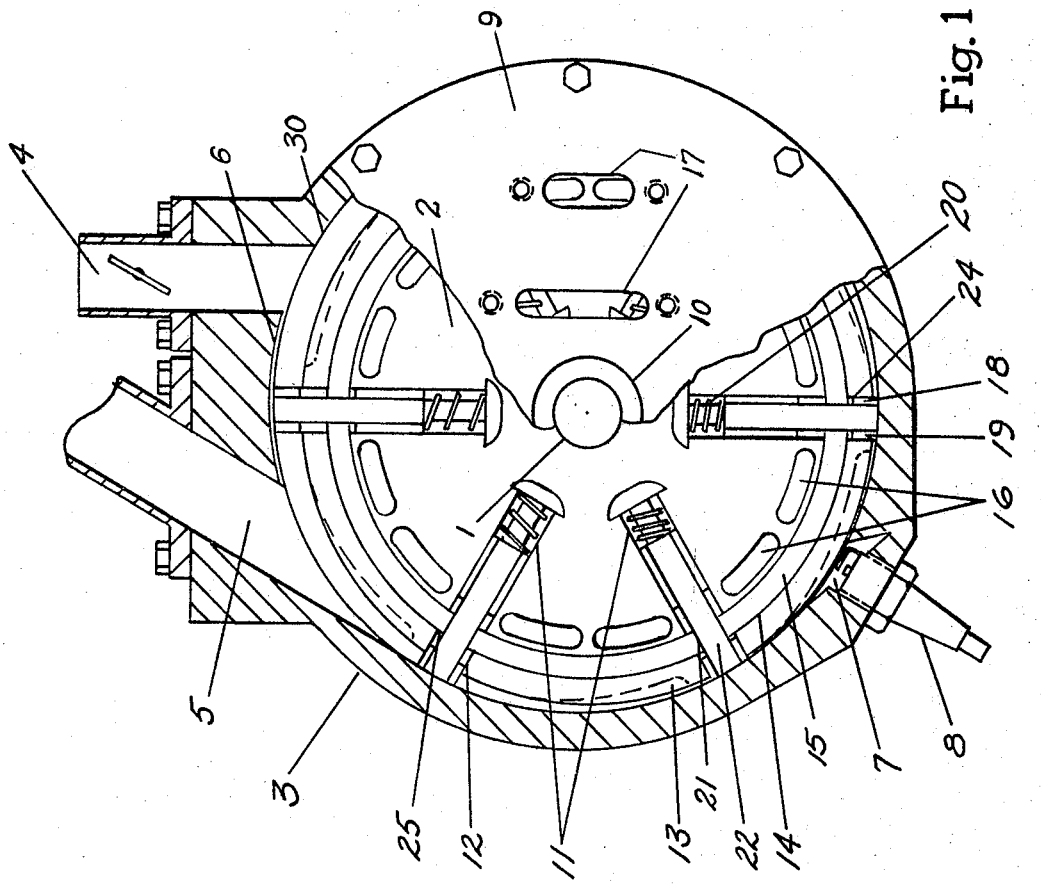
FIGURE 1 illustrates in a cutaway end view a rotary combustion engine device embodying the required mechanical components in suitable arrangement.
Figure 2:
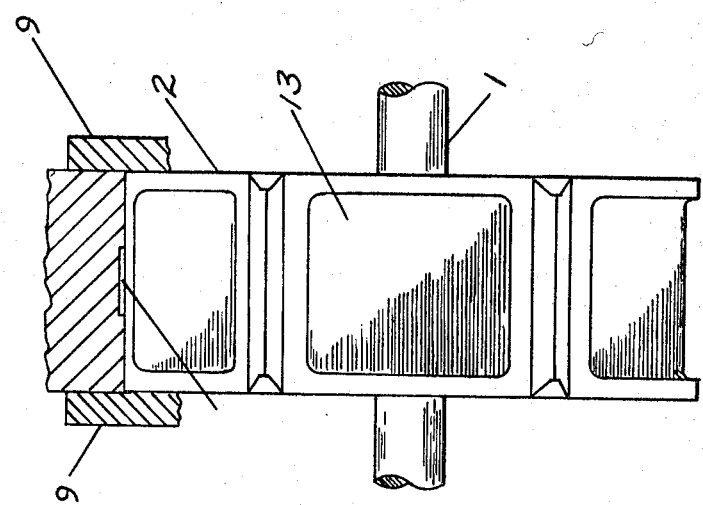
FIGURE 2 illustrates in side view rotary engine rotor with rotor recess and relief between stator and rotating vanes.
Figure 3:
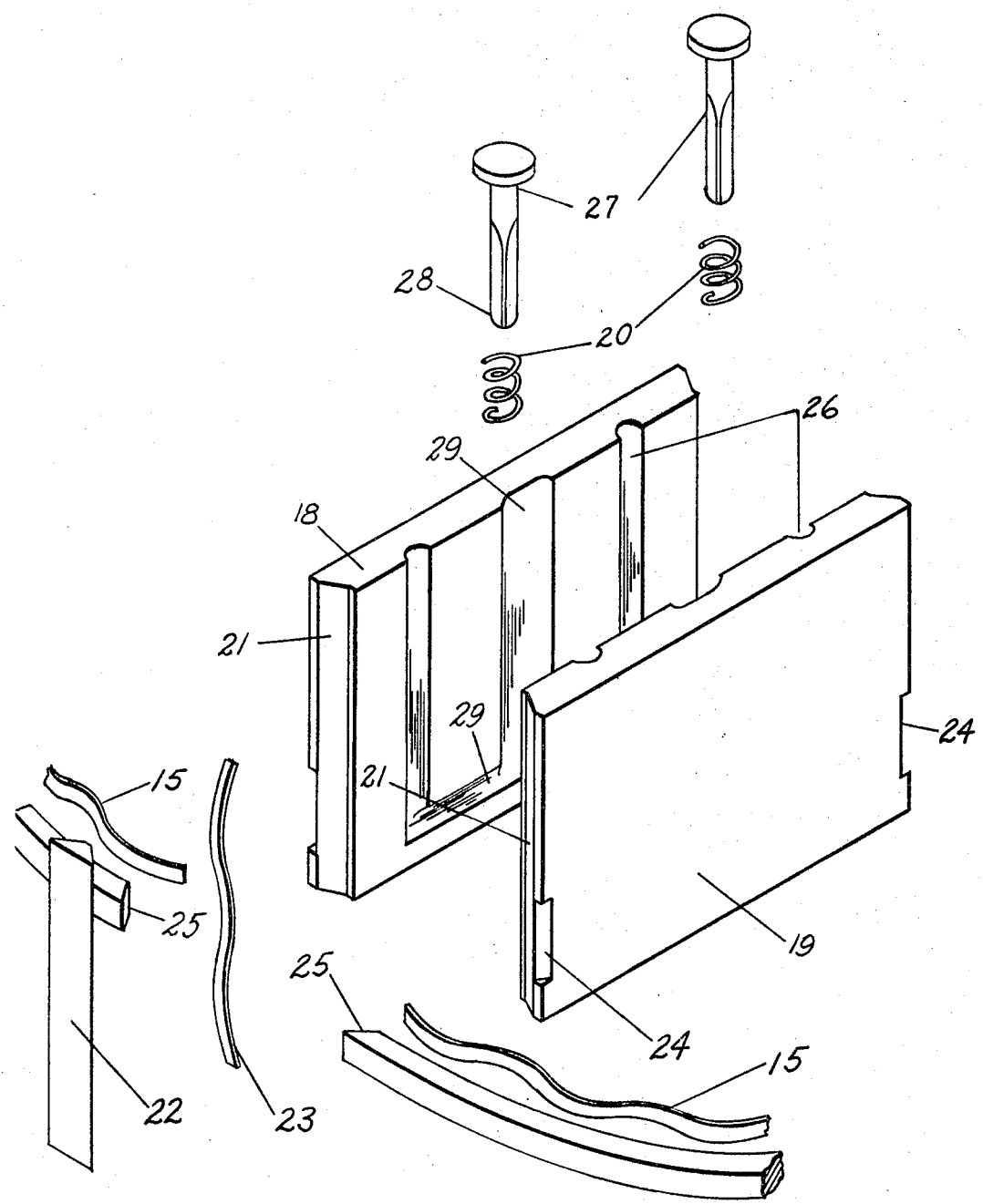
FIGURE 3 illustrates in exploded view rotor vane with seals and oil circulating device.

The drawings illustrate an engine of this invention as having a shaft 1 suitably fixed centrally in a rotor 2 which is eccentrically set in a stator 3 having a circular inner chamber 30. The stator has an intake port 4 for air or air-fuel mixture and an exhaust port 5 for exhausting the combusted gases. The stator is undercut 6 on the chamber wall of the stator between the exhaust port and intake port. The stator also has a recess 7 for a glow plug 8 or other igniter in the area of high compression. This area being where the rotor rim is at perigee with the stator inner chamber wall. The stator has fitted on both sides, end covers 9 which enclose the sides and support clutch type shaft bearings 10. The bearings allow the shaft of the rotor to rotate in only one direction.

The rotor has four or more radial slots 11 fitting into these slots are slidable radial vanes 12. The rotor has a cavity or pocket 13 in each segment lying between the vanes on the distal area of the rotor. The rotor has a recess 14 for circumferential seals 15 extending from vane to vane near the outer edge of the rotor. The rotor also has elongated through holes 16 to the proximal side of the circumferential seals.

The end covers 9 are fitted with orifices 17 so constructed as to overlap one hole or parts of two elongated through holes and/or vane slots of the rotor. Fastened to the end cover orifice on one cover is oil pumping means and on the opposed end cover oil returning means (not shown).

The vanes are constructed of two separate blades 18 and 19 sliding independently of each other and acting as a first and second seal between the rotor and the chamber wall. The vanes are pressed against the stator by means of coil springs 20. The vanes having on either side and to the center a triangular shape recess 21 or variation thereof, fitted therein are side seals 22 being of the same length as said vanes and having band or wire springs 23 to press the seals out against the end covers and so engaged with the vanes as to move the side seals with the vanes. The vanes are chamfered 24 on both blades 18 and 19 and both sides opposite to the common center to receive the chamfered end 25 of the circumferential seal. The chamfer of the blades being in length equal to the travel of the vane plus the width of the circumferential seal. The vane blades are bored 26 to receive a fixed oil plunger 27. The oil plunger having a grooved guiding tip 28 which allows passage of oil to the bore of the vane when vane is extended out of the vane slot. The bore 26 of the vane has a continuous track 29 for circulating oil when vane is pressed into vane slot and oil plunger bore is forced over the oil plunger.

Intake air which may be enriched by a super-charger is drawn into the chamber between the vanes by the suction force of one vane and entrapped by the next vane in sequence. Induced rotation causes this entrapped air to be compressed because of the eccentric position of the rotor to the stator and the sealing qualities of the vanes, side seals and circumferential seals. As the sealed chamber moves to a point of high compression a glow plug ignites the mixture causing an expansion force against the rotor and vanes. No ignition timing device is necessary as the igniter can be firing continuously. The wedge shaped igniter recess is to cause turbulence and give direction to the expanding force. The rotor has a cavity in each segment between vanes on the distal area for the expanding force to work against. This cavity of the rotor is shallow at the end which passes by the igniter first and runs deeper toward the rear of the segment. The deeper part of the cavity is being further compressed by the expanding gasses as it moves to the igniter. Because of the rotating forces and time the flame front always stays ahead and the cavity will not provide a path for the expanding gas to reverse direction.

As the rotor rotates the sweeping action of the vanes help the exhausted fumes out the exhaust port. The locating of the exhaust orifice to the top of the engine also aids in exhausting as the heated gas rises up and out. An exhaust fan can be added to further purge the chamber. A relief between vanes and stator inner chamber wall is provided between the exhaust port and intake port to minimize the drawing of the exhausted fumes into a new cycle.

The rotor is cooled by oil being pumped through the end cover orifices through the elongated holes of the rotor to the opposed end cover. The opposed end cover having oil returning means to direct the oil flow through the vane slots back to the oil pump and oil cooling means.

The stator may be cooled by water with appropriate cooling channels, radiator and pumping means. The stator may also be cooled by air and heat sink fins.

Both rotor and stator can be air cooled. In this design the stator end covers must have openings corresponding with openings in the rotor to the proximal side of the circumferential rotor seals. The rotor must also have another set of seals similar to the circumferential seals to the proximal side of the rotor air openings for containing the oil. The oil pumping orifice is located over one set of vane slots and oil return means over another set of vane slots to lubricate and cool the sliding members therein.

This invention like other rotary combustion engines suffers from no scale effects and can be made in sizes from small hand models to very large stationary units.

While the particular rotary internal combustion engine herein disclosed is capable of attaining the objects and providing the advantages stated, it is to be understood that it is only the presently preferred embodiment of the invention and that changes can be made within the scope of the following claims.

What is claimed is:

1. In a rotary internal combustion engine of the radial vane type having a stator with a circular inner chamber and a centrally shafted circular rotor of a smaller diameter mounted eccentrically therein, having end covers whereby the rotor shaft is mounted and the chamber sides are enclosed, said stator having an intake port and an exhaust port, said stator being undercut on the inner chamber wall of the stator between the exhaust port and intake port, said stator having a recess for an igniter in the area where the rotor is at perigee with the stator circular inner chamber wall, said rotor having a plurality of radial slots, fitted into these slots are radially slidable vanes, said vanes being projected out into sliding engagement with the stator inner chamber wall by means of coil springs, said vanes having on both sides a recess for side seals, said side seals being projected out of the vane recess by resilient means into sliding engagement with the end covers, said rotor having a recess near the circumference of the rotor extending from vane to vane for circumferential seals, said circumferential seals being projected by resilient means into sliding engagement with the stator end covers, said side seals meeting in sliding engagement the geometrically corresponding end of the circumferential seals, said rotor having a cavity in each segment lying between the vanes on the distal area of the rotor, said rotor having through openings in the segments between the vanes to the proximal side of the circumferential rotor seals, said end covers having ports, said ports eclipsing the through openings of the rotor, said projecting springs of said vanes having a stationary oil plunger core, said vanes having an oil plunger bore in line with said oil plunger, said vane bore being in continuity with an oil return track.

2. In a rotary internal combustion engine of the radial vane type having a stator with a circular inner chamber and a centrally shafted circular rotor of a smaller diameter mounted eccentrically therein, having end covers whereby the rotor shaft is mounted and the chamber sides are enclosed, said stator having an intake port and an exhaust port, said stator being undercut on the inner chamber wall of the stator between the exhaust port and intake port, said stator having a recess for an igniter in the area where the rotor is at perigee with the stator circular inner chamber wall, said rotor having a plurality of radial slots, fitted into these slots are radially slidable vanes, said vanes being projected out into sliding engagement with the stator inner chamber wall by means of coil springs, said vanes having on both sides a recess for side seals, said side seals being so engaged with the vane as to move with said vane, said side seals being projected out of the vane recess by resilient means into sliding engagement with the end covers, said rotor having a recess near the circumference of the rotor extending from vane to vane for circumferential seals, said circumferential seals being projected by resilient means into sliding engagement with the stator end covers, said side seals meeting in sliding engagement the geometrically corresponding end of the circumferential seals, said rotor having a cavity in each segment lying between the vanes on the distal area of the rotor, said rotor having through openings in the segments between the vanes to the proximal side of the circumferential rotor seals with corresponding vent openings in the stator end covers, said rotor having a recess for oil seals extending from vane to vane to the proximal side of the rotor openings and being projected out into sliding engagement with the end covers by resilient means, said oil seals meeting the side seal with geometrically corresponding ends in sliding engagement, said rotary engine also having oil pumping means in one stator end cover and oil return means in the opposed end cover in line with said vane slots, said projecting springs of said vanes having a stationary oil plunger core, said vanes having an oil plunger bore in line with said oil plunger, said vane bore being in continuity with an oil return track.

References Cited

UNITED STATES PATENTS 2,902,980   9/1959   Barrett.

JULIUS E. WEST, *Primary Examiner.*